May 11, 1948.　　　L. H. UNDERWOOD　　　2,441,458
FISHHOOK DISGORGER
Filed Feb. 28, 1944
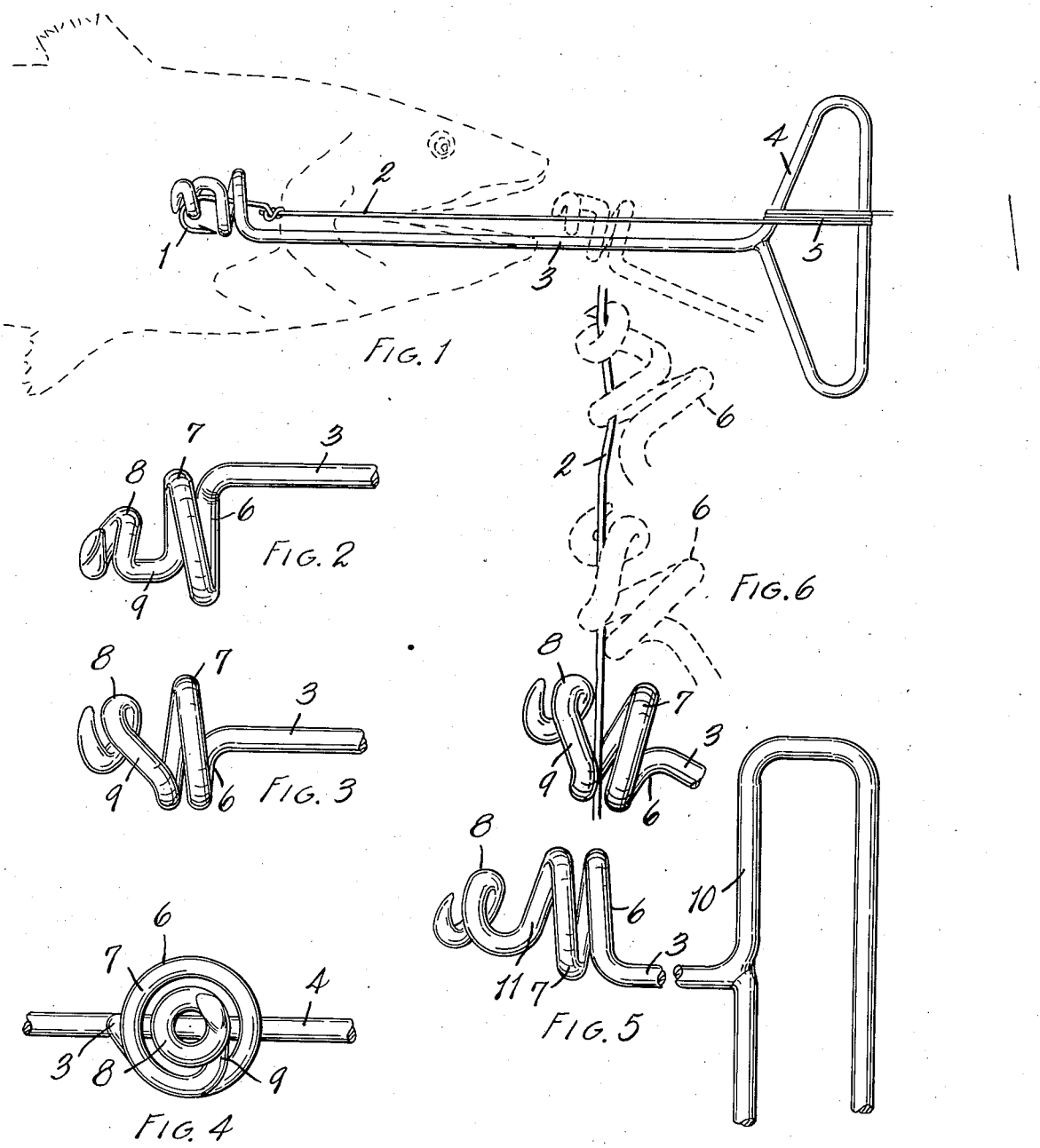
INVENTOR.
LEON H. UNDERWOOD
BY
Earl Chappell
ATTORNEY.

Patented May 11, 1948

2,441,458

UNITED STATES PATENT OFFICE 2,441,458

FISHHOOK DISGORGER

Leon H. Underwood, Kalamazoo, Mich.

Application February 28, 1944, Serial No. 524,153

7 Claims. (Cl. 43—29)

This invention relates to improvements in fish hook disgorger.

The main objects of this invention are:

First, to provide a fish hook disgorger which is very convenient to use and greatly facilitates the disengagement and removal of the hook, even when quite deeply engaged in the throat of a fish.

Second, to provide a disgorger which effectively locates the hook without the necessity for visual locating effort on the part of the user.

Third, to provide a disgorger having these advantages which effectively prevents re-engagement of the hook during the withdrawal thereof.

Fourth, to provide a disgorger which operates with straight push and pull movements, that is, without the application of twisting stresses to the hook and one in which the hook is not dulled or distorted.

Fifth, to provide a disgorger having these advantages which is very economical to produce and at the same time strong and durable.

Objects pertaining to details and economies of the invention will definitely appear from the description to follow. The invention is defined in the claims.

Structures which embody the features of the invention are clearly illustrated in the accompanying drawing, in which:

Fig. 1 is a side elevation of a disgorger embodying the features of my invention engaged with a hook preparatory to withdrawal thereof, the position of the hook and of the line being illustrated and the engaged portion of the disgorger with the line preparatory to engagement of the hook being indicated by dotted lines.

Fig. 2 is an enlarged fragmentary side elevation illustrating certain details of structure of the preferred embodiment illustrated.

Fig. 3 is a fragmentary side elevation with the disgorger rotatably positioned approximately 90 degrees from the position shown in Fig. 2.

Fig. 4 is a fragmentary end elevation.

Fig. 5 is a fragmentary side elevation of a slightly modified form or embodiment of my invention.

Fig. 6 is a diagrammatic view illustrating steps or motions which may be used in preliminary engaging the disgorger with the fishing line.

In the accompanying drawing the hook 1 is of the conventional type and 2 represents the fishing line. It will be understood that the term line is for convenience used in this description and in the claims in its broad sense, to include or embrace a leader, snood or snell commonly used by fishermen to connect the hook to the line proper, such leaders, snoods or snells being commonly of gut or other material to render them inconspicuous. Such leaders, snoods or snells are sometimes of a character to minimize injury by the fish.

My improved disgorger is formed of any suitable material and may desirably be formed of a single piece of wire. In the accompanying drawing I have illustrated the disgorger as formed of wire. The disgorger comprises a shank 3 of substantial length having a loop at one end thereof constituting a handle 4 disposed transversely of the shank. This handle is of convenient size and shape for grasping, but it also serves the further purpose of permitting the line 2 to be wrapped or snubbed there-around, as illustrated at 5 in Fig. 1. At its other end the shank is provided with a conical spiral designated generally by the numeral 6 and comprising a plurality of coils, two coils 7 and 8 being provided in the structure illustrated. These coils are substantially spaced axially by means of the reach 9 which is of a pitch substantially exceeding the pitch of the coils 7 and 8. It will be noted that the inner coil 7 is of substantially greater diameter than the outer coil 8. The convolutions constituting the coils 7 and 8 slightly exceed in extent a complete convolution.

It will be noted that when the bight of the hook is engaged with the outer coil 8 with the shank within the coils the point of the hook lies adjacent to but spaced from the coil 7 which constitutes a guard for the hook while it is being withdrawn. In use the coils are engaged with the line and this may be done by presenting the line between the convolutions of the coils which are open to receive it and the line brought within the coils by a rocking or tilting movement. When the line is within the coils the disgorger is pushed down the line and is guided thereby until the coils pass over the shank of the hook and the outer coil engages the bight of the hook. When the hook has been engaged the operator wraps the line around the handle as illustrated in Fig. 1, in which position the hook is held firmly within the outer coil of the disgorger. After that has been done the hook may be disengaged from the fish by pushing inwardly and then withdrawn by an outward pull and this without any twisting or turning. The hook cannot re-engage owing to its point being effectively guarded by the inner coil. The disgorger is effectively and easily operated, even when a hook lies quite deeply within the throat or gullet of a fish.

In the embodiment of the invention illustrated in Fig. 5 the handle 10 is of rectangular shape and may be preferred by some as it overcomes any tendency for the line to slip when it is wrapped around the handle. However, this tendency is so slight as not to be objectionable, even when the handle is tapered toward each end as shown, and the operator usually places a finger on the wrapped portion of the line. In Fig. 5 the reach 11 connecting the inner and outer coils is slightly more curved than shown at 9 in Fig. 2 in the embodiment described. In both cases the hook engaging coil and the guard coil are desirably spaced so that the point of the hook does not contact with the guard coil.

While a single sized disgorger may have coil 7 of a diameter sufficiently large that the same will constitute a guard for a range of three and four sizes of hooks, it is not considered desirable to attempt to make one disgorger having a coil 7 of such a large diameter that it will guard all sizes of hooks, although if desired the device may be made to accommodate a wide range of sizes. By reference particularly to Fig. 1, it will be readily seen how the coil 7 acts as a guard to prevent the hook 1 from penetrating the fish when the disgorger and hook are being removed from the mouth of the fish. It will be understood by fishermen that certain fish have small mouths and that in a measure prevents the use of a disgorger adapted to accommodate large hooks without injury to the fish; however, the disgorger may be manipulated for use on small-mouthed fish such as bluegills without injury to the fish by a slight tilting and turning movement.

I have illustrated and described the invention in very practical embodiments thereof. I have not attempted to illustrate or describe other modifications and adaptations of the invention as it is believed this disclosure will enable the adaptation thereof as may be desired.

Having thus described the invention, what I claim as new and desirable to secure by Letters Patent is:

1. A disgorger comprising a shank having a handle at one end, said handle having a portion thereof disposed substantially at right angles to said shank about which a fishing line may be wrapped, said shank having a member of a conical spiral-like shape at its other end comprising axially spaced coils connected by a reach substantially exceeding the pitch of the coils, the inner coil being of a diameter substantially exceeding the diameter of the outer coil to constitute a guard for the point of the hook, the bight of which is adapted to be engaged with the outer coil with the shank of the hook within the coils, the inner larger coil constituting a guard disposed outwardly beyond the path of movement of the point of the hook when the disgorger and hook are being withdrawn from the mouth of the fish to prevent said point from penetrating the flesh of the fish upon such withdrawal.

2. A disgorger formed integrally of wire comprising an elongated shank having a loop at one end conformed to constitute a handle disposed transversely of the shank, said handle having a portion thereof disposed substantially at right angles to said shank around which a line may be wrapped to snubbingly retain it, said shank having member of a conical spiral-like shape at its other end comprising outer and inner laterally open coils, each coil slightly exceeding in extent a complete convolution, the diameter of the inner coil substantially exceeding the outer coil and constituting a guard for the point of a hook, the bight of which is adapted to be engaged in the outer coil, the inner larger coil constituting a guard disposed outwardly beyond the path of movement of the point of the hook when the disgorger and hook are being withdrawn from the mouth of the fish to prevent said point from penetrating the flesh of the fish upon such withdrawal.

3. A disgorger comprising a shank having a handle at its one end, said handle having a portion thereof disposed substantialy at right angles to said shank about which a fishing line may be wrapped, said shank having a member of a conical spiral-like shape at its outer end comprising axially spaced coils, the inner coil being of a diameter substantially exceeding the diameter of the outer coil and constituting a guard for the point of a hook, the bight of which is adapted to be engaged with the outer coil and the shank of the hook within the coils, the inner larger coil constituting a guard disposed outwardly beyond the path of movement of the point of the hook when the disgorger and hook are being withdrawn from the mouth of the fish to prevent said point from penetrating the flesh of the fish upon such withdrawal.

4. A disgorger comprising a shank having a handle at one end, a conical spiral including an inner larger coil and an outer smaller coil, said spiral being disposed at the other end of the shank and disposed for engagement with a fishing line and adapted to receive a fish hook with the bight of the hook adapted for engaging the outer coil and with the shank of the hook within the coils, the inner coil of the spiral being of such diameter relative to the diameter of the outer smaller coil as to constitute a guard for the point of a hook when so engaged, the inner larger coil constituting a guard disposed outwardly beyond the path of movement of the point of the hook when the disgorger and hook are being withdrawn from the mouth of the fish to prevent said point from penetrating the flesh of the fish upon such withdrawal.

5. A disgorger comprising a shank having a spiral at one end comprising a plurality of complete coils, the outer coil being substantially spaced from an inner coil, such inner coil being of a diameter substantially exceeding the diameter of the outer coil and constituting a guard for the point of a hook, the bight of which is adapted to be engaged within the outer coil and the shank of which hook is within the coils of the spiral, the coils being spaced to permit the engagement of a line therewith when presented laterally to a line, the inner larger coil constituting a guard disposed outwardly beyond the path of movement of the point of the hook when the disgorger and hook are being withdrawn from the mouth of the fish to prevent said point from penetrating the flesh of the fish upon such withdrawal.

6. A disgorger comprising a shank having a relatively small coil at one end thereof for supportingly engaging the bight of a hook and a larger coil spaced inwardly from said small coil, said coils being open laterally thereof to permit the insertion of a fishing cord in the coils without passing an end of the cord longitudinally through the coils, said inner larger coil constituting a guard disposed outwardly beyond the path of movement of the point of the hook when the disgorger and hook are being withdrawn from the mouth of a fish to prevent said point penetrating the flesh of the fish upon said withdrawal.

7. A disgorger comprising a shank having a member of conical-like shape at one end comprising a plurality of longitudinally spaced coils, with which a fishing cord may be engaged, the outer of said coils being relatively small and adapted to engage the bight of a hook, the inner of said coils being relatively large and constituting a guard disposed outwardly beyond the path of movement of the point of the hook when the disgorger and hook are being withdrawn from the mouth of the fish to prevent said point from penetrating the flesh of the fish upon such withdrawal.

LEON H. UNDERWOOD.

REFERENCES CITED

The following references are of record in the file of this patent:

UNITED STATES PATENTS

| Number | Name | Date |
| --- | --- | --- |
| 112,959 | Raymond | Mar. 21, 1871 |
| 179,090 | Barnes | June 27, 1876 |
| 1,611,544 | Maurus | Dec. 21, 1926 |
| 2,050,194 | Pflueger | Aug. 4, 1936 |
| 2,054,236 | Behr | Sept. 15, 1936 |
| 2,244,270 | Verrett | June 3, 1941 |

FOREIGN PATENTS

| Number | Country | Date |
| --- | --- | --- |
| 13,912 | Great Britain | June 23, 1898 |
| 235,367 | Great Britain | June 18, 1925 |
| 623,872 | France | Mar. 28, 1927 |